Figure 1:
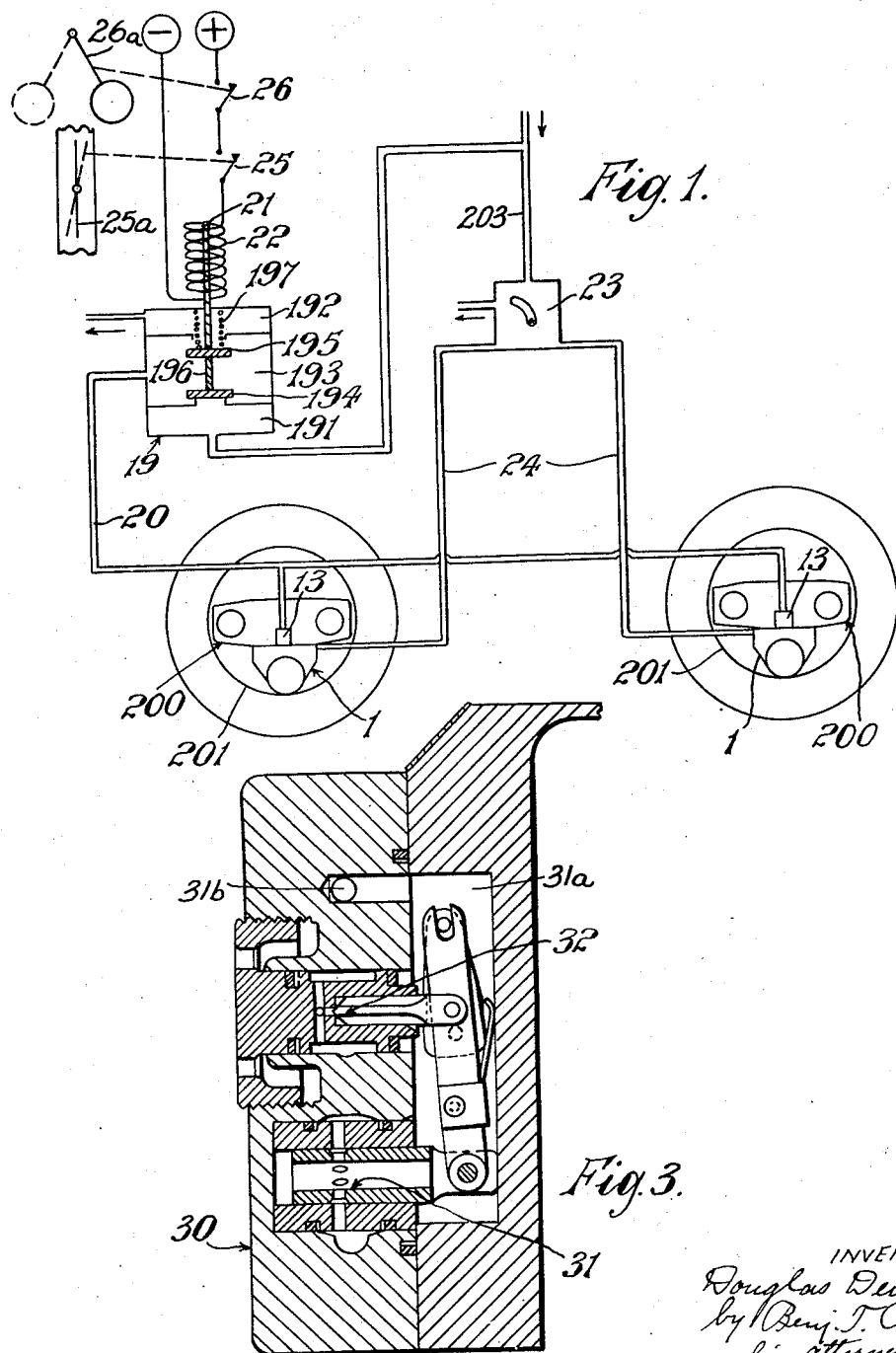

Dec. 14, 1954  D. DEWAR  2,696,958
AIRCRAFT LANDING WHEEL BRAKING SYSTEM
Filed March 22, 1952  3 Sheets-Sheet 1

INVENTOR
Douglas Dewar
by Benj. T. Rauber
his attorney

Dec. 14, 1954 D. DEWAR 2,696,958
AIRCRAFT LANDING WHEEL BRAKING SYSTEM
Filed March 22, 1952 3 Sheets-Sheet 3

INVENTOR.
DOUGLAS DEWAR
BY
ATTORNEY

United States Patent Office 2,696,958
Patented Dec. 14, 1954

2,696,958

AIRCRAFT LANDING WHEEL BRAKING SYSTEM

Douglas Dewar, Wolston, near Coventry, England, assignor to Dunlop Rubber Company Limited, London County, England, a British company Application March 22, 1952, Serial No. 277,999

Claims priority, application Great Britain April 7, 1951

7 Claims. (Cl. 244—111)

This invention relates to braking systems for aircraft and particularly to braking systems incorporating an automatic brake control unit.

Automatic brake control units comprising a rotary inertia mechanism are known, whereby the braking pressure on the landing wheel brakes is restricted to that value which will give maximum retardation without skidding of the wheel. Such a unit is more fully described in co-pending application of Trevaskis, Ser. No. 195,509, filed November 14, 1950, now Patent No. 2,656,017, and comprises a housing rotatable by a wheel, a flywheel rotatable in said housing, a drum-member also rotatable in said housing and capable of limited angular displacement relative to said flywheel, means movable axially by said angular displacement, and a valve mechanism adapted to be connected to a source of fluid pressure, to exhaust, and to the brake, and operated by axial movement of said means whereby on relative angular displacement between the drum-member and flywheel in one direction the axially movable means operates the valve mechanism to reduce the braking pressure and on relative angular displacement in the other direction the axially movable means operates the valve mechanism to restore the braking pressure.

It is important that the pilot of an aircraft, on coming in to land, should not apply the brakes and lock the landing wheels before contact has taken place, since the wheels would skid and damage to the tyre and undercarriage would occur. On an aircraft fitted with an automatic brake control unit of the type described above it is particularly important that the brakes are not applied before the landing wheel rotates, since the functioning of the rotary inertia mechanism is dependent on the rotation of the wheel on the ground.

In co-pending application of Trevaskis and Mortimer, Ser. No. 221,436, filed April 17, 1951, a device is described which makes it impossible for the braking pressure applied by the pilot to reach the brake-operating mechanism until after the wheels have been rotated by the first impact with the ground. This device, which is preferably associated with an automatic brake control of the type described, comprises a valve, means for connecting it between a source of pressure fluid and a fluid pressure operated wheel brake, means actuated by lowering movement of an undercarriage for closing the valve, centrifugally operated mechanism for opening said valve and means for operatively connecting said mechanism to an associated wheel.

It frequently happens, however, that a landing aircraft touches down and then, for one of a variety of reasons, is forced to take off once more and make another circuit before landing. This "baulked landing condition" may be caused, e. g. by an obstruction on a runway. If the aircraft is fitted with the apparatus described above the short touchdown period of the aircraft prior to its enforced take off is sufficient to cause the wheels to rotate, thus operating the device and allowing pressure fluid to flow to the brakes. Thus when the aircraft touches down the second time the brakes are on, and the wheels may be locked, with deleterious effects on the tyres and undercarriage.

The object of the present invention is to provide an improved braking system for aircraft fitted with automatic brake control units wherein the above objection is overcome. Another object of this invention is to provide an improved braking system applicable for fixed undercarriage aircraft.

According to the invention a braking system for aircraft comprises an automatic brake control apparatus for controlling the braking pressure to an aircraft wheel, a fluid-pressure operated device for preventing the application of braking pressure before the wheel rotates on landing, a connection between said device and a source of fluid pressure, and a solenoid-operated inlet and exhaust valve mechanism interposed in said connection, said mechanism normally connecting the device to exhaust and operated by means of a switch associated with the aircraft throttle whereby the closing of said throttle beyond a predetermined position energises said solenoid to open the inlet valve and close the exhaust valve.

Preferably the brake control apparatus is of the type more fully described in Patent No. 2,656,017 and the device for preventing the application of braking pressure before the wheel rotates is of the type more fully described in application Ser. No. 221,436.

Figure 2:
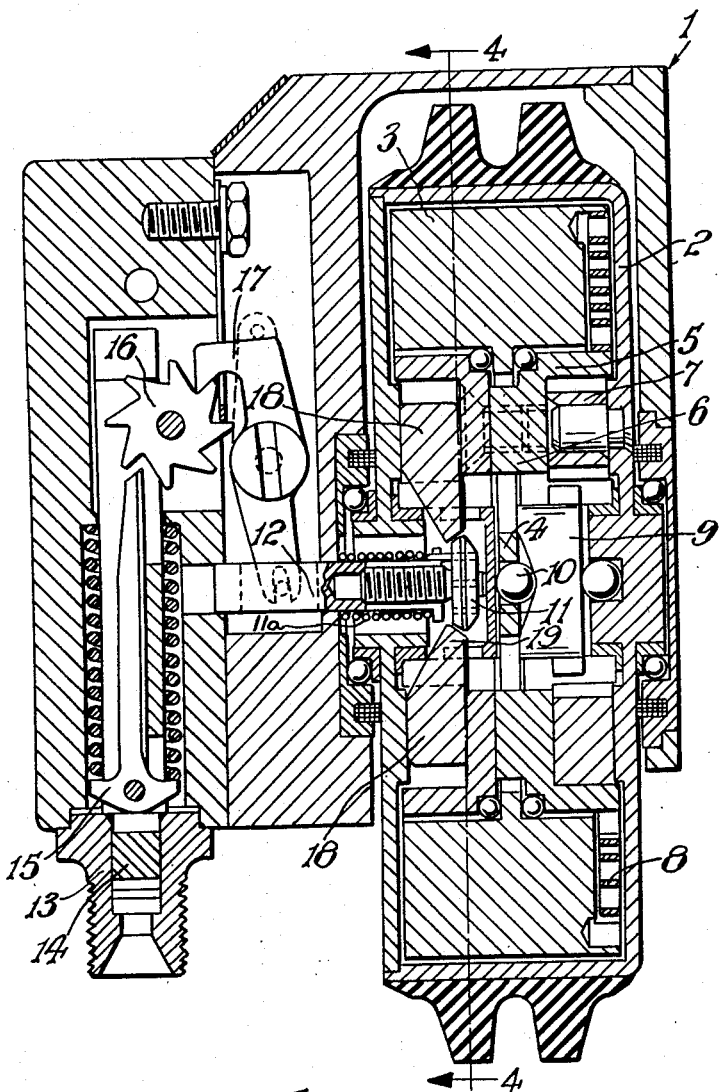
Figure 4:
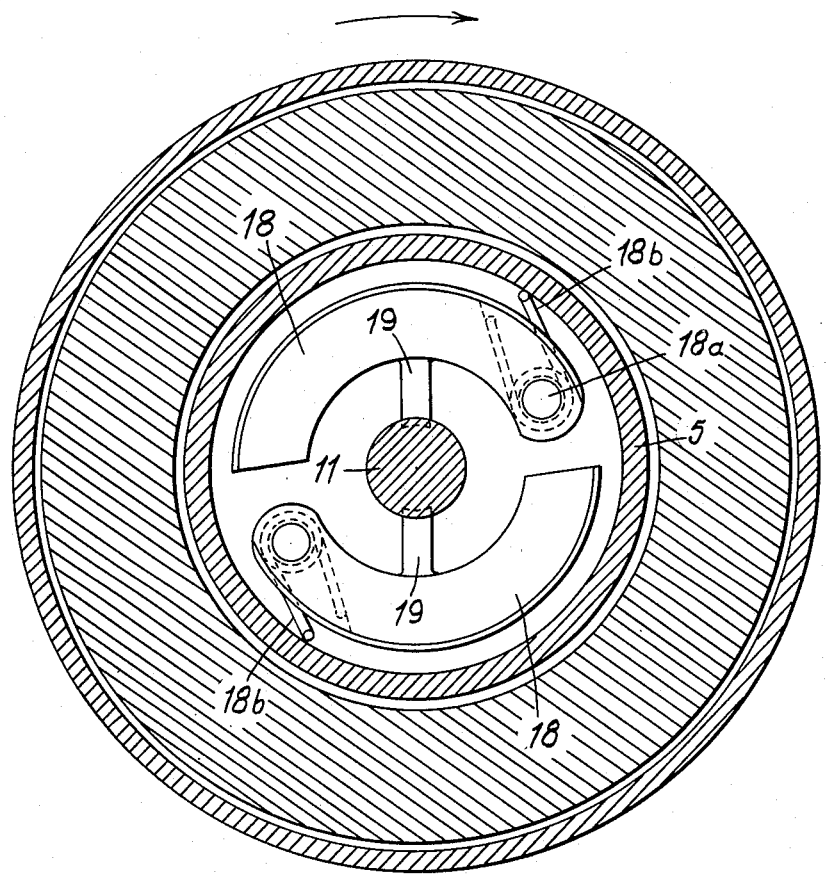

In order that the invention may be more fully described, reference is made to the accompanying drawings, of which:

Fig. 1 is a diagrammatic representation of a braking system in accordance with the present invention, Fig. 2 is a sectional elevation of a combined brake control apparatus and device for preventing the application of braking pressure before the wheel rotates, Fig. 3 is a section of a valve mechanism controlled by the apparatus of Figure 2 for the application of selected braking pressure, and Fig. 4 is a section on line 4—4 of Fig. 2.

In this embodiment of the invention a braking system for aircraft comprises an automatic brake control unit 1 (Figs. 1 and 2) secured to each of the aircraft landing wheels and connected to the brakes 200 associated with said wheels 201 and with a source of fluid pressure 203 under the control of the pilot of the aircraft. Each of said control units comprises a housing 2 (Fig. 2) rotatable with a wheel, and an annular flywheel 3 rotatable in said housing having a beam 4 extending diametrically across the interior thereof. A drum member or rotor 5 is also rotatable in the housing and within the inner periphery of the flywheel and is provided with two diametrically opposed stops 6 adapted to contact the flywheel beam and restrict angular movement of the flywheel relative to the drum member. A clutch mechanism 7 is fitted within the drum member, said clutch mechanism being driven by the housing and driving the drum member. A coil spring 8 is fitted within the housing and on one side of the flywheel, having one end secured to the flywheel and the other end to said drum member and this coil spring urges the flywheel into a predetermined angular position wherein the flywheel beam abuts one side of the said stops. Means 9, 10, 11 and 12 are movable axially on relative angular displacement of said flywheel from said predetermined angular position and a valve mechanism 30 (Fig. 3) is provided comprising an inlet valve 31 from the supply of pressure fluid to an operating chamber 31a connected to the brakes by a connection indicated at 31b and an outlet valve 32 operated by axial movement of said means. On angular displacement between the drum member and flywheel in one direction the axially movable means operates the valve mechanism to reduce or release the braking pressure and on relative angular displacement in the other direction the axially movable means operates the valve mechanism to restore the braking pressure. Any suitable mechanism may be employed to connect the mechanism 9–12 to the valve mechanism 30 as, for example, a connecting shaft and crank arms.

This apparatus, and the way in which it operates, is more fully described in co-pending application Ser. No. 195,509.

A device is provided for preventing the application of the brakes before the landing wheels rotate on touchdown, the device being attached to the automatic brake control unit hereinabove described. Said device is also illustrated in Fig. 2 and is more fully described in co-pending patent application Ser. No. 221,436. It comprises a cylinder 13 and a piston 14 slidable therein, a spring-loaded plunger 15 associated with said piston and movable thereby, a ratchet wheel 16 rotatable by said plunger, and a pawl and lever 17 associated with said ratchet wheel. The means for controlling the inlet and exhaust valves comprises the spring-loaded operating rod 12 which is provided at one end with the chamfered annular member 11. Two spring-loaded centrifugal releases 18 are associated with the drum member, each having a peg 19 extending radially inwards therefrom to engage the annular member. The rod 12, chamfered head 11 and releases 18 form a latch to hold the inlet valve closed and exhaust valve open until released. As shown in Fig. 4, the two centrifugally releasable latches 18 are each pivoted at one end on a pivot pin 18a to a radial wall of the housing and at their free ends are pressed resiliently inwardly by light springs 18b which, however, yield to sufficient centrifugal force to permit the latches to swing outwardly. The disc 11 is thereupon released, permitting a spring 11a to push the rod 12 to the right as shown in Fig. 2. The pawl and lever is also operatively associated with the operating rod. Thus as the cylinder is pressurized the piston and plunger move outwardly of the cylinder, the ratchet wheel is rotated by the plunger and the ratchet wheel, in rotating, operates the pawl 17 and lever to move the operating rod into a position in which the inlet valve 31 is closed and the exhaust valve 32 open. The inclined surfaces of the pawl act as cam surfaces to tilt the pawl. The operating lever is maintained in this position by the annular member engaging behind the pegs of the centrifugal releases which move outwardly against their springs as the annular member passes and are spring urged back behind the annular member to lock the operating rod in its new position.

In our co-pending application Ser. No. 221,436 the cylinders 13 of each of said devices are described as being operatively connected to the extension side of an undercarriage jack so that when the undercarriage is lowered the device is "cocked" in the manner described to prevent application of the wheel brakes before the wheels rotate on landing. In a system according to the present invention (shown diagrammatically in Fig. 1), the cylinders 13 are connected through a solenoid-operated valve 190, Fig. 1, to the source of fluid pressure 203.

The solenoid-operated valve comprises a pressure chamber 191 at one end thereof communicating with the source of fluid pressure, and an exhaust chamber 192 at the other end thereof communicating with exhaust or a fluid reservoir. An intermediate operating chamber 193 communicates through a fluid pressure line 20 with the cylinders 13 of the devices for preventing the application of brakes before the wheels rotate on landing. An inlet valve 194 is provided between the pressure chamber and the operating chamber, the inlet valve seat extending into the operating chamber and the inlet valve being located therein. Similarly an exhaust valve 195 is provided between the operating chamber and the exhaust chamber, the exhaust valve seat extending into the operating chamber and the exhaust valve also being located therein. Said valves are coaxially aligned at opposite ends of the operating chamber.

The valves are rigidly linked by a rod 196 whereby when the inlet valve is open the exhaust valve is closed and vice versa. The rod extends fluid-tightly through an aperture in the exhaust chamber and is formed as a core 21 of a solenoid device, the windings thereof being represented by the numeral 22.

A compression spring 197 inserted between the exhaust valve and the opposite wall of the exhaust chamber normally maintains the inlet valve closed and the exhaust valve open.

A valve, shown diagrammatically at 23, is under the control of the pilot of the aircraft and has one fluid connection to the source of fluid pressure, one to exhaust and one connection 24 to each of the automatic brake control devices, 1, hereinbefore described. The valve may be of the type fully described and claimed in our British Patents Nos. 507,162 and 525,266, whereby differential braking may be obtained.

The solenoid winding is connected across a source of potential with a switch 25 which is actuated by movement of the throttle 25a controlling the aircraft as indicated diagrammatically in Fig. 1. Thus, as the throttle is closed beyond a certain predetermined position the switch is closed. Another switch 26 is interposed in series in the circuit, which is operable by movement of the oleo leg 26a of the undercarriage as indicated diagrammatically in Fig. 1 and this switch is closed when the undercarriage is lowered to the landing position.

The system operates as follows. As the aircraft comes in to land the pilot lowers the undercarriage thus closing the switch 26 associated with the oleo leg, the throttle switch remaining open. As the aircraft approaches the landing ground the throttle is closed beyond the predetermined position and the throttle switch 25 is thereby closed, thus completing the circuit. The solenoid is energised, opening the inlet valve and closing the exhaust valve. Pressure fluid flows through the valve to the cylinder of the device, operating the piston therein to lock the operating rod 12 in the manner hereinbefore described, and prevent the application of the wheel brakes.

As the aircraft wheels touch the ground they commence to rotate, spinning the centrifugal releases and allowing the operating rod to move back into its operative position. Thereafter the braking of the aircraft is controlled by the automatic brake control apparatus. If, however, the landing is "baulked" the pilot opens his throttle to take off again and complete another circuit before landing. As the throttle is opened the throttle switch is opened, de-energising the solenoid and allowing the inlet valve to close and the exhaust valve to open under the influence of the spring. On landing once more the throttle is closed, the throttle switch is closed and the operating rod moved once more to the locked position where it is retained by centrifugal releases until the wheel is rotating on the runway.

Thus, no matter how many times the aircraft landing is baulked, the system according to the present invention will prevent the application of the wheel brakes before the wheels rotate on landing.

The system of the present invention may also conveniently be applied to aircraft having fixed undercarriages.

Having described my invention what I claim is:

1. A braking control mechanism for fluid operated aircraft brakes which comprises a fluid supply having a control valve to control the supply of fluid to, and exhaust of fluid from, said brakes, a latch to hold said valve closed to fluid supply and open to exhaust, an engine throttle control and a resetting mechanism actuated by the engine control to close said valve and reset said latch.

2. The braking control mechanism of claim 1 in which said resetting mechanism actuated by the engine control comprises an electric circuit and a solenoid closed upon movement of the throttle to closed position.

3. The braking control mechanism of claim 1 in which said resetting mechanism actuated by the engine control comprises a fluid actuated plunger to move said latch to close the fluid supply, an electro-magnetic valve for admitting fluid to and exhausting it from said fluid actuated plunger, an electric circuit comprising said electro-magnetic valve and a control switch operated by the throttle control.

4. The braking control mechanism of claim 1 in which said latch comprises spring pressed elements to hold said latch, and a rotor rotatable from the wheels of the aircraft to rotate said spring pressed elements to withdraw them centrifugally against the action of said springs and release said latch.

5. A braking system for fluid pressure operated wheel brakes of aircraft having a throttle for controlling the engine power comprising an automatic brake control apparatus for controlling the braking pressure to an aircraft wheel brake, a fluid pressure operated device for preventing the application of braking pressure before the wheel rotates on landing, a valve mechanism comprising an inlet valve and an exhaust valve, a spring to normally close the inlet valve and open the exhaust valve, an electrically operated solenoid to open the inlet valve and close the exhaust valve, a fluid connection between said valve mechanism and a source of fluid pressure, a fluid connection between said valve mechanism and said device to connect said device to exhaust when the said exhaust valve is open, and a switch operatively connected to the aircraft throttle whereby the closing of said throttle beyond a predetermined position energizes said solenoid to open the inlet valve and close the exhaust valve.

6. A braking system according to claim 5 for aircraft having a retractable undercarriage, comprising a second switch in series with said first switch, and closed by lowering movement of said undercarriage and in conjunction with said first switch energizing said solenoid to open the inlet valve and close the exhaust valve.

7. A braking system according to claim 6 comprising a wheel brake, a brake control valve, a fluid connection between said brake and said brake control valve, a fluid connection between said brake control valve and said valve mechanism, a spring-loaded operating rod for opening and closing said control valve, means associated with said fluid pressure operated device for moving said operating rod against the spring into a control valve closed position and centrifugal releases associated with the wheel for allowing the operating rod to move to a control valve open position when the wheel rotates on landing.

References Cited in the file of this patent

UNITED STATES PATENTS

| Number | Name | Date |
|---|---|---|
| 1,727,696 | Breguet | Sept. 10, 1929 |
| 2,225,978 | Carmichael | Dec. 24, 1940 |
| 2,593,910 | Morris | Apr. 22, 1952 |